(12) United States Patent
Keener et al.

(10) Patent No.: US 6,494,972 B1
(45) Date of Patent: Dec. 17, 2002

(54) METHOD FOR PREPARING PRE-COATED FERROUS ALLOYS AND FERROUS COMPONENTS PREPARED THEREBY

(75) Inventors: Steven G. Keener, Trabuco Canyon, CA (US); Kevin T. Ruth, Trabuco Canyon, CA (US)

(73) Assignee: Boeing North American, Inc., Seal Beach, CA (US)

( * ) Notice: Subject to any disclaimer, the term of this patent is extended or adjusted under 35 U.S.C. 154(b) by 0 days.

(21) Appl. No.: 09/678,275

(22) Filed: Oct. 3, 2000

Related U.S. Application Data

(62) Division of application No. 09/152,217, filed on Sep. 11, 1998, now Pat. No. 6,274,200.

(51) Int. Cl.[7] ............................................. B32B 15/08
(52) U.S. Cl. ..................... 148/529; 428/220; 428/328; 428/332; 428/421; 428/457; 428/461
(58) Field of Search ................... 428/220, 323, 428/328, 332, 411.1, 421, 457, 461, 506; 148/529

(56) References Cited

U.S. PATENT DOCUMENTS

| | | | |
|---|---|---|---|
| 1,829,623 A | 10/1931 | Wright | |
| 3,804,679 A | 4/1974 | Streel | |
| 3,954,460 A | 5/1976 | Nickola | |
| 3,983,304 A * | 9/1976 | Sekhon | 428/460 |
| 4,228,203 A | 10/1980 | Yagi et al. | |
| 4,530,858 A | 7/1985 | Brun | |
| 4,542,048 A | 9/1985 | Nickola et al. | |
| 4,655,852 A | 4/1987 | Rallis | |
| 4,678,717 A | 7/1987 | Nickola et al. | |
| 4,937,114 A * | 6/1990 | Wasson et al. | 428/461 |
| 5,547,769 A | 8/1996 | Schmitz | |
| 5,614,037 A | 3/1997 | Keener | |
| 5,858,133 A | 1/1999 | Keener | |
| 5,922,472 A * | 7/1999 | Keener | 428/472.2 |
| 5,944,918 A * | 8/1999 | Keener | 148/251 |

* cited by examiner

Primary Examiner—George Wyszomierski
(74) Attorney, Agent, or Firm—Alston & Bird LLP

(57) ABSTRACT

A ferrous-alloy aircraft structural component such as a fastener is prepared by providing a ferrous-alloy component precursor that is not in its final heat-treated state, and coating with an aluminum-containing, curable organic coating material having a non-volatile portion that is predominantly organic and is curable at about the ferrous-alloy component's tempering temperature. The coated, ferrous-alloy is then tempered to concurrently impart predetermined metallurgical properties to the finished, ferrous-alloy material, and cure the organic, aluminum-containing coating.

24 Claims, 3 Drawing Sheets

METHOD FOR PREPARING PRE-COATED FERROUS ALLOYS AND FERROUS COMPONENTS PREPARED THEREBY

CROSS-REFERENCE TO RELATED APPLICATIONS

This application is a divisional of U.S. application Ser. No. 09/152,217, filed Sept. 11, 1998, now U.S. Pat. No. 6,274,200.

BACKGROUND OF THE INVENTION

This invention relates to the preparation of pre-coated ferrous-alloy components. More particularly, the present invention relates to the use of aluminum-containing organic, corrosion-inhibiting coatings to coat ferrous alloys used as aircraft structural components.

Aircraft manufacturers use a variety of different ferrous non-ferrous metals in the fabrication of aircraft components. Commonly assigned U.S. Pat. No. 5,614,037 discloses a method for pre-treating aluminum articles to obviate the use of wet-sealants and other coatings for protection against corrosion damage. Ferrous alloys such as carbon steels and aircraft-quality low-alloy steels, for example; Aermet 100, HY-TUF™, 300M, H-11, HP9-4-30, 52100, 1095, 4130, 4135, 4140, 4330V, 4340, 6150, 8740, etc. are often used as structural aircraft components. Typically, these ferrous-alloy components which include fasteners, bearings, struts, etc., are protected from wear and corrosion by applying an overplate of cadmium alone or in combination with a chrome plate. These fasteners are often installed using wet-sealant. While this plated overcoat and/or use of wet-sealant protects the ferrous substrate from corrosion, such cadmium and chrome-plating and wet-sealant installation processes are time consuming, cumbersome, expensive and environmentally undesirable.

It would be extremely desirable to impart corrosion resistance to the ferrous substrate obviating the need for the chrome and cadmium-plating and/or wet-sealant installation processes. It would be further highly desirable to incorporate the coating cure step into an existing alloy fabricating process.

SUMMARY OF THE INVENTION

The present invention provides a method for preparing and treating ferrous-alloy aircraft structural components such as fasteners, fittings, hinges, bearings, gears, struts, etc., and the mechanical structures attached to these afore-mentioned components. The ferrous-alloy components of the present invention are heat-treated to impart good mechanical properties and also are protected by a cured, organic corrosion-resistant coating. The application of the organic coating obviates the need for cadmium or chrome-plating and/or use of wet-sealant during installation and does not adversely affect the desired final properties or performance of the component. To the contrary, the corrosion-resistant properties of the coated components are enhanced as compared to the properties of the plated and/or wet-sealant installed components.

One embodiment of the present invention relates to a method for providing a corrosion-resistant coating to a high-strength, ferrous-alloy aircraft structural component. An aircraft structural component made from a ferrous-alloy precursor is provided and subjected to an austenitizing treatment. The ferrous substrate is then quenched, followed by an optional "snap" heat-treat tempering step. The ferrous substrate is then coated with an aluminum-containing, curable organic coating having a non-volatile portion that is predominantly organic. The coating is curable at about the ferrous-alloy component's heat-treatment tempering temperature, and is applied to the ferrous-alloy precursor prior to the final fall tempering step. The coating is flash cured (200° F. for about 1–2 minutes). The coated, ferrous-alloy precursor is then tempered to concurrently 1) impart predetermined metallurgical properties or characteristics to the finished ferrous-alloy component, and 2) cure the organic, aluminum-containing coating.

In a further embodiment, the coated, ferrous-alloy component is formed, cold-worked or thread rolled into a completed or partially completed form and installed.

In a still further embodiment, the present invention relates to a further method for coating a high-strength, ferrous-alloy aircraft structural component with a corrosion-resistant coating. A high-strength aircraft structural component made from a ferrous-alloy precursor is provided and austenitized/normalized, followed by quenching. The component is then subjected to an optional "snap" temper step. The component is cold-worked or otherwise formed such as, by thread rolling, and then coated with an aluminum-containing, curable organic coating material having a non-volatile portion that is predominantly organic and is curable at about the ferrous-alloy material's heat-treatment tempering temperature. The ferrous-alloy precursor is then subjected to the tempering temperature of from about 400° F. to about 1150° F. for a duration of from about 30 minutes to about 3.5 hours. The appropriate ranges depend on the specific ferrous-alloy being treated. Most preferably for the components of the present invention, the tempering temperature is about 825° F. for about 1 hour. This tempering operation concurrently 1) imparts the desired metallurgical characteristics to the ferrous alloy material and 2) cures the coating.

These embodiments yield surprising and unexpected technical and cost advantages when used in conjunction with high-strength, ferrous-alloy aircraft structural components such as bearings, hinges, fittings, gears, struts, fasteners, etc. Through the use of the coating techniques of the present invention, the need to plate the ferrous alloys with cadmium or chrome and/or use wet-sealant in their installation for corrosion protection is obviated.

Other features and advantages of the present invention will be apparent from the following more detailed description of the preferred embodiment, taken in conjunction with the accompanying drawings, which illustrate, by way of example, the principles of the invention.

DETAILED DESCRIPTION OF THE INVENTION

Figure 1A:
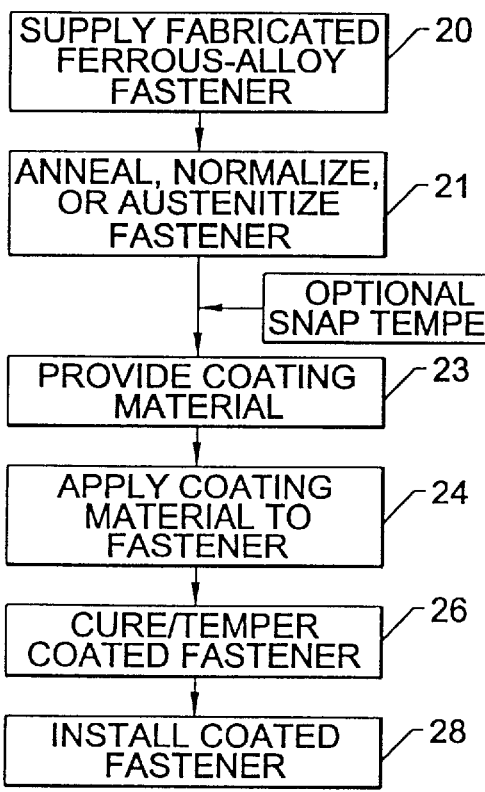
FIG. 1A is a process flow diagram for a first embodiment of the method of the invention.

FIG. 1A is a schematic flow diagram outlining one preferred method of the present invention whereby a ferrous-alloy fastener 20 is supplied and annealed, normalized, austenitized or stress-relieved 21. The partially-treated fastener is then optionally snap tempered 22. A coating material is provided 23 and applied 24 to the fastener by various methods which is then exposed to a curing/tempering step 26 followed by installation 28. The curing step takes place at specific and predetermined conditions of time, pressure and temperature for the specific alloy being processed, such that the coating is cured concurrently with the tempering of the ferrous alloy.

Figure 1B:
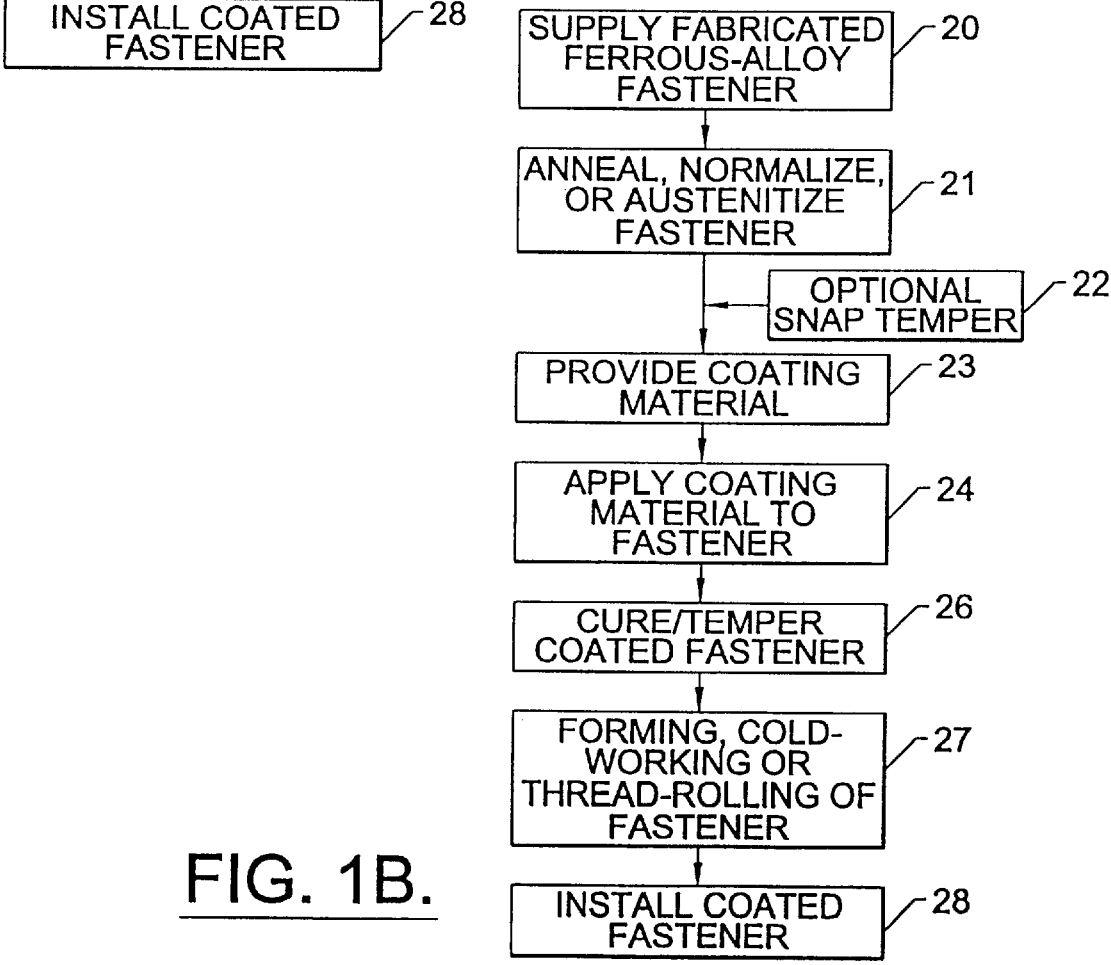
FIG. 1B is a process flow diagram for a further embodiment of the method of the invention.
Figure 1C:
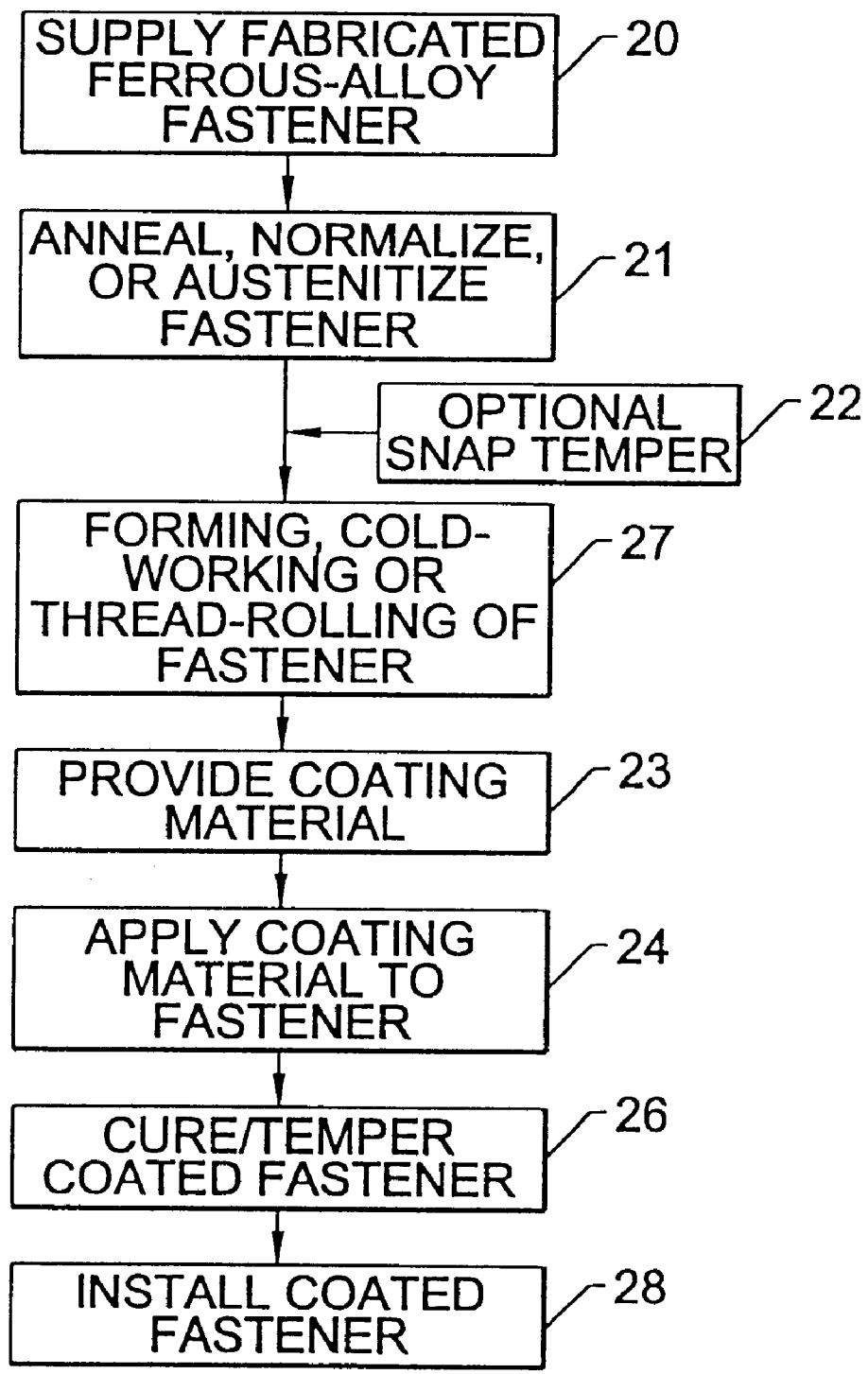
FIG. 1C is a process flow diagram for still a further embodiment of the method of the invention.

The outlined methods of FIGS. 1B and 1C are similar to FIG. 1A, but include the step 27 of further processing the fastener by forming, cold-working, or thread-rolling the fastener at different steps in the process.

The present invention contemplates using any high-strength, ferrous-alloy material compatible with the selected aluminum-containing, organic corrosion-inhibiting coating formulation requiring a subsequent aging/curing period. The subsequent aging/curing period can be conducted at an elevated temperature to facilitate curing. Once cured, it is preferred that the coating be tack-free to enable handling. The coating thickness achievable by the present invention may vary according to the preferred end-result characteristics of the coated component, but preferably coating thicknesses range from about 0.0003 to about 0.0005 inch.

One preferred embodiment of the invention relates to the preparation of fasteners such as threaded bolts, and the following discussion will emphasize such articles. The use of the invention is not limited to fasteners, and instead is more broadly applicable. However, its use in fasteners offers particular advantages that will be discussed. The fasteners contemplated by the present invention include screws, bolts, pins, rivets, etc., which may have threads, and have female mating components such as nuts, lock washers, etc.

The process of the present invention is especially useful for ferrous-alloy components used in aircraft construction such as, for example, landing gears, machined fittings, and other high-strength structural components such as fasteners and bearings. Fasteners are understood to mechanically join the various structural elements and subassemblies of aircraft. For example, a large transport aircraft, such as the C-17 typically includes over one million total fasteners such as bolts, screws and rivets. When such fasteners are formed from a ferrous-containing alloy, to insure protection from corrosion, each fastener must be coated with a suitable protective plate such as cadmium or chrome. In addition, to further facilitate corrosion protection, such fasteners are installed with a wet-sealant that is toxic and requires special handling during application. The sealant further requires careful and expensive cleaning and special removal and handling as a hazardous waste.

Typical wet-sealants include, two-part, manganese-cured, polysulfide sealants containing an additional quantity of soluble metallic chromates. These are flowable viscous materials which are applied by brush, spatula, roller or extrusion gun. Examples are P/S 1422 or 870 C corrosion-inhibiting sealants produced by Courtaulds Aerospace, Glendale, Calif. By contrast the process of the present invention precoats the components with an organic coating and obviates the need for the use of wet-sealant during the installation and assembly process.

The ferrous-alloy components of the present invention achieve their full, required strength and other metallurgical properties produced by the heat-treatment as well as curing of the coating. Achieving a specified strength level of the substrate is important, because users of the components, such as the customers of aircraft, will not permit a sacrifice of mechanical performance in order to achieve improved corrosion protection. In the past, they have required both acceptable mechanical performance and also the use of cadmium or chromium plating and/or the use of wet-sealant to achieve acceptable corrosion protection. In the present approach, on the other hand, the aircraft structural components have both acceptable mechanical performance and a method for providing acceptable corrosion protection.

With regard to aircraft bearings and fasteners, the elimination of the requirement for the wet-sealant installation approach for more than 1,000,000 fasteners in a large cargo aircraft offers a significant cost savings of several hundreds of thousands of dollars per aircraft. The elimination of the use of wet-sealants also improves the overall quality and workmanship in the fastener installation, as there is no possibility of missing or overlooking some of the fasteners as the wet-sealant is applied. Further, the pre-coated fasteners provide the same if not better protection from corrosion during service than the uncoated, wet-installed fasteners.

Figure 2:
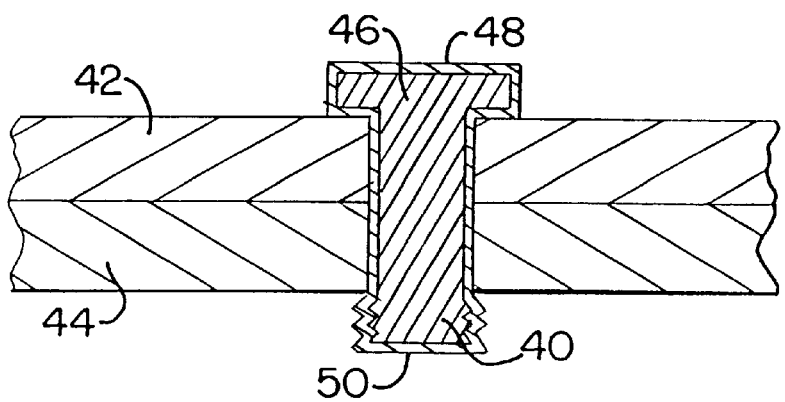
FIG. 2 is a schematic cross-sectional view of protruding-head fastener used to join two pieces, without a female component.
Figure 3:
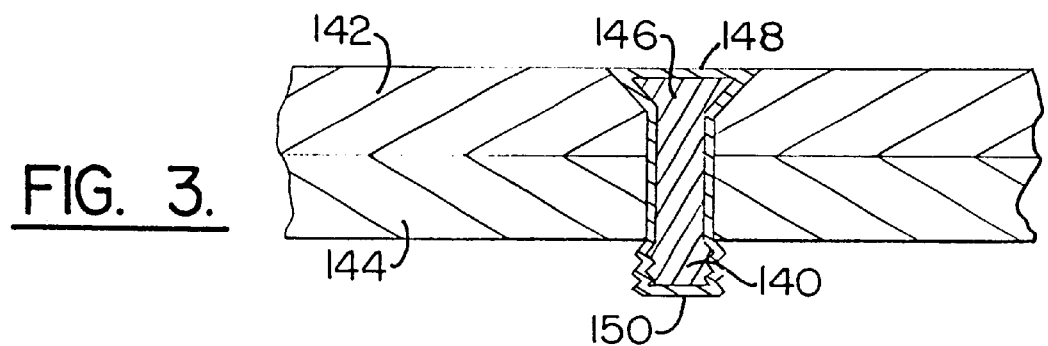
FIG. 3 is a schematic cross-sectional view of a flush-head fastener used to join two pieces, without a female component.
Figure 4:
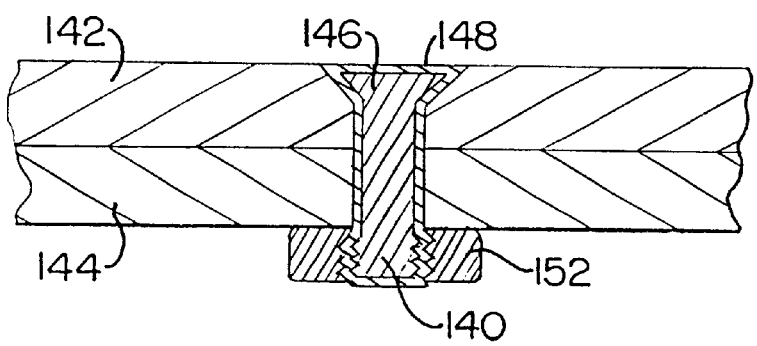
FIG. 4 is a schematic view of the flush-head fastener of FIG. 3, with a female component.

The present invention preferably is used with a bolt, fastener, or other article manufactured to any conventional shape and size. FIGS. 2-3 illustrate two preferred embodiments with two types of bolts 40, 140, at an intermediate state of their installation to join a first piece 42, 142 to a second piece 44, 144, after installation to the first and second pieces but before use of the female component or nut 152. The bolt 40 of FIG. 2 has a premanufactured protruding head 46 on one end and a threaded portion 50, at the opposite end. The bolt 140 of FIG. 3 has a premanufactured flush head 146 on one end, that resides in a countersink 141 in the piece 142. The present invention may be used with these and other types of fasteners. FIG. 4 shows a female component or nut 152 engaged with the threaded portion 150 of bolt 140.

The preferred bolts are manufactured from a ferrous-alloy material. As used herein, "ferrous alloy" or "ferrous-containing alloy" means that the material has more than about 50 percent by weight iron. Typically, the ferrous-alloy material has at least about 80 percent by weight of iron, with the balance being alloying elements and a minor amount of impurities. Alloying elements are added in precisely controlled amounts to modify the properties of the ferrous-alloy material as desired. Alloying elements that are added to iron to modify its properties include, for example, carbon, manganese, silicon, nickel, chromium and molybdenum.

In one embodiment, the ferrous-alloy material is heat-treatable. The article is first fabricated to a desired shape, for example a fastener such as a bolt. In order to impart strength to the article, the article must then be heat-treated. In the solution treating or austenitizing/hardening process, the article is heated to an elevated temperature where a Face-Centered-Cubic phase called "austenite" is formed. While still at this elevated temperature, the article is rapidly quenched, reverting the austenite to a Body-Centered-Tetragonal phase called "martensite." Untempered martensite is a hard, brittle phase and must be softened by a process called "tempering." In the tempering process, the austenitized and quenched article is subjected to an elevated temperature which is much lower than the austenitizing temperature. This tempering process softens the part and imparts toughness.

Tempering must occur shortly after the austenitizing and quenching procedure, or fissures or cracking may occur leading to part failure. If the part must be processed (i.e. straightened, coated, etc.) prior to a full temper, the article can be given an intermediate and abbreviated "snap" temper.

This snap temper softens the ferrous alloy slightly and reduces the likelihood of cracking.

Collectively, all of the processing steps leading to the strengthening of the material or article are generally termed "heat-treating", wherein the article is subjected to one or more periods of exposure to an elevated temperature for a duration of time, with heating and cooling rates selected to aid in producing the article's desired final, metallurgical properties. The temperatures, times, and other parameters required to achieve particular properties are known to those skilled in the metallurgy field and are available in reference documents for standard ferrous-alloy materials.

A preferred, specific ferrous-alloy material for fastener applications is the 8740 alloy (UNS G87400) per MIL-S-6049, which has a nominal composition of 0.38 to 0.43 percent carbon, 0.50 percent chromium, 0.55 percent nickel and 0.25 percent molybdenum, with the balance being iron plus minor impurities. Other contemplated ferrous-alloys include, but are not limited to, 1095, 4130, 4135, 4140, 4340, 6150, Hy-Tuf™, H-11, 300M, and Aermet 100 series heat-treatable ferrous-alloys. The 8740 alloy is available commercially from several companies, including Kobe Wire of Japan. After fabricating the alloy to the desired shape such as a fastener like those shown in FIGS. 2–4, the 8740 alloy may be fully annealed, normalized and stress relieved. This state is usually obtained following fabricating including machining, forging, or otherwise forming the fastener into the desired shape. Following these steps, the ferrous-alloy material is hardened or austenitized, quenched and, if necessary, "snap" tempered. This condition is termed the "untreated state" herein, as it precedes the final, full-tempering heat-treatment soak required to optimize the strength and other properties of the material. The article may be subjected to multiple forming operations and periodically re-annealed as needed, prior to the strengthening or hardening, heat-treatment processes.

A coating material is provided 22, preferably in solution so that it may be readily and evenly applied. The usual function of the coating material is to protect the base metal to which it is applied from corrosion, including, for example, conventional electrolytic corrosion, galvanic corrosion, and stress corrosion. The coating material is a formulation that is primarily of an organic composition, but which may contain additives to improve the properties of the final coating. In one preferred embodiment the coating is initially dissolved in a carrier liquid so that it can be applied to a substrate. After applying, the coating material is curable to effect structural changes within the organic component, typically cross-linking of the organic molecules to improve the adhesion and cohesion of the coating. The coating layer 48, 148 on the preferred fastener is shown in FIGS. 2–4.

Such a curable coating is distinct from a non-curable coating, such as a lacquer, which has different properties and is not as suitable for the present, corrosion-protection application. With a non-curable coating such as a lacquer, there is no need to heat the coated article to elevated temperatures for curing. Thus, the over-aging problems associated with the use of curable-coating materials, and which necessitate the present invention, simply do not arise. It is further understood that optional cleaning steps may be required to prepare the base metal for coating. Such cleaning procedures are those well known to those skilled in the coating field and include the use of solvents, acids, alkalines, and mechanical methods.

The present process contemplates a number of curable organic coating materials. A typical and preferred coating material has a phenolic resin mixed with one or more plasticizers, other organic components such as polytetrafluoroethylene, and inorganic additives such as aluminum powder and/or strontium chromate. These coating components are preferably dissolved in a suitable solvent present in an amount to produce a desired consistency based upon the desired end use.

For the coating material just discussed, the solvent preferably is a mixture of ethanol, toluene, and methyl ethyl ketone (MEK). A typical sprayable coating solution has about 30 percent by weight ethanol, about 7 percent by weight toluene, about 45 percent by weight methyl ethyl ketone as the solvent, about 2 percent by weight strontium chromate, and about 2 percent by weight aluminum powder, with the balance being phenolic resin and plasticizer. Optionally, a small amount of polytetrafluoroethylene may be added. Such a product is available commercially as "Hi-Kote 1" from Hi-Shear Corporation, Torrance, Calif. The coating material has a standard elevated temperature curing treatment of 1 hour at 400° F. ±25° F., as recommended by the manufacturer.

As shown by the process outlined in FIGS. 1A and 1B, the coating material is applied to the untreated fastener in coating step 24. Any suitable coating approach, such as dipping, spraying, brushing, or a fluidized bed method can be used. In the preferred approach, the solution of coating material dissolved in solvent is sprayed onto the untreated bolts. The solvent is removed from the as-applied coating by drying or "flash cure", either at room temperature or slightly elevated temperature, so that the coated article is dry to the touch. Preferably, evaporation of solvent is accomplished by flash cure or exposure at 200° F. for about two minutes. The coated component is still not suitable for service at this point, because the coating is not sufficiently cured and adhered to the ferrous-alloy component and because the coating itself is not sufficiently coherent to resist corrosion or mechanical damage in service.

In the case of the preferred Hi-Kote 1 coating, the as-sprayed coating was analyzed by EDS analysis in a scanning electron microscope. The heavier elements were present in the following amounts by weight: Al, 82.4 percent; Cr, 2.9 percent; Fe, 0.1 percent; Zn, 0.7 percent; and Sr, 13.9 percent. The lighter elements such as carbon and oxygen were detected in the coating but were not reported because the EDS analysis for such elements is not generally accurate.

The base, ferrous-alloy metal of the bolt and the applied coating are together heated to a suitable elevated temperature in a cure/temper step 26, to achieve two results simultaneously. In this single step, the ferrous-alloy material is tempered to its final, desired strength state, and the coating is aged to its desired final cured or bonded state.

Preferably, the temperature and time associated with the treatment of step 26 is selected to be that required to achieve the desired properties of the ferrous-alloy metal, as provided in the industry-accepted and proven process standards for that particular ferrous-alloy material. This treatment is typically not that specified by the coating manufacturer and may not produce the most optimal cure state for the coating, but it has been determined that the heat-treat hardening or tempering of the metal is less forgiving of slight variations from the optimal treatment than is the curing treatment of the organic coating. That is, according to the present invention, the curing of the coating can sustain larger variations in time and temperature with acceptable results than can the heat-treatment tempering or hardening process of the ferrous-alloy material. Contrary to expectations and manufacturer's specifications, the coating cured by the non-recommended procedures exhibits desirable adhesion to the ferrous-alloy substrate. The coating also exhibits other desirable properties during the life of the coated object. Thus, the use of the recommended heat-treatment tempering or hardening soak process of the metal yields the optimal physical properties of the metal, and extremely good coating properties. In the case of the preferred 8740 ferrous alloy and Hi-Kote 1 coating discussed above, the preferred heat-treatment is the tempering treatment process of the 8740 alloy: namely about 1 hour at about 825° F.

Thus, the tempering or hardening soak procedure 26 involves a significantly different temperature than is recommended by the manufacturer for the organic coating. There was initially a concern that the higher temperature, beyond that required for the standard curing of the coating, would degrade the coating and its properties during service. Surprisingly, this concern proved to be unfounded. The final coating 48, shown schematically in FIGS. 2–4, is strongly adherent to the ferrous-alloy metal substrate and is also strongly coherent and cross-linked. In FIGS. 2–4, the thickness of the coatings 48 and 148 is exaggerated so that it is visible. In reality, the coating 48 (FIG. 2) is typically about 0.0003 to about 0.0005 inch thick after treating in step 26.

After coating and drying, the coated and treated bolt 40 is ready for installation, numeral 28. The fastener is installed in the manner appropriate to its type. In the case of the bolt 40, the bolt is placed through aligned bores in the two mating pieces 42 and 44 placed into faying contact, as shown in FIG. 2. As shown in FIGS. 3 and 4, the remote protruding threaded end 150 of the bolt 140 has a female component, such as nut or collar installed so that the pieces 142 and 144 are mechanically captured between the premanufactured head 146 and a female component or threaded nut 152 of the bolt. FIG. 4 illustrates the threaded nut 140 for the case of the flush head, and the general assembly configuration of the bolts of the other types of bolts is similar. The coating 148 is retained on the bolt even after assembly, as shown in FIG. 4.

As mentioned above, the installation step reflects one of the advantages of the present invention. If the coating were not applied to the fastener, it would be necessary to place a viscous wet-sealant material into the hole and onto the bolt prior to its installation, which in turn coats the contacting adjacent surfaces. The wet-sealant material is potentially toxic to workers, messy, difficult to work with, and necessitates the use of extensive cleanup tools as well as exposing surfaces of the pieces 42 and 44 to caustic chemical solutions after installation of the fastener. Moreover, it has been observed that the presence of residual wet-sealant inhibits the adhesion of later-applied paint and other topcoats applied over the bolt heads.

The coating process of the present invention overcomes these problems confronted by the use of wet-sealants. According to the process of the present invention, wet-sealant is not needed or used during installation. Additionally, the later-applied paint or other top coats adhere well over the pre-coated bolt heads.

The following example serves only to further illustrate aspects of the present invention and should not be construed as limiting the invention.

EXAMPLE 1

The present invention also has been reduced to practice with bolts made of 8740 ferrous-alloy metal. The bolts, initially in the untreated state, were spray-coated with Hi-Kote 1. The coated bolts were then tempered to 180,000 psi minimum tensile condition with the full and final tempering treatment of 1 hour at 825° F.

The coated bolts were mechanically tested in accordance with MIL-B-87114 to verify that they met the required ultimate tensile and shear strength requirements of 3,930 pounds and 10,460 pounds minimum, respectively, required for standard, uncoated bolts. In the testing, the ultimate tensile and shear strengths were 4,500 pounds and 11,370 pounds, respectively, well above the required, minimum allowable levels. Bolts were also installed and subsequently removed to evaluate coating integrity using a Scanning Electron Microscope (SEM). The coatings exhibited no signs of cracking, spalling, or any other unacceptable conditions or abnormalities. The coatings were retained on the bolts even after the assembly process. Thus, the coatings remained in place to protect the bolt against corrosion after installation, obviating any need for the use of wet-sealants.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A corrosion resistant aircraft structural ferrous-alloy component prepared according to the method comprising the steps of:

providing an aircraft structural component made from a ferrous-alloy precursor having a predetermined heat-treatment temperature;

subjecting the component to a hardening treatment;

providing a curable organic coating material having a non-volatile portion that is curable at about the predetermined ferrous-alloy heat-treatment temperature;

applying the coating material to the component; and curing the coated component to a temperature of from about 800 to about 850° F. for a duration of from about 45 to about 75 minutes.

2. A corrosion-resistant structural ferrous-alloy component prepared according to the method comprising the steps of:

providing an aircraft structural component made from a ferrous-alloy precursor having a predetermined heat-treatment temperature;

subjecting the component to a hardening treatment;

providing as a curable organic coating material, an organic, phenolic resin mixed with at least one plasticizer and an inorganic additive selected from the group consisting of aluminum powder and strontium chromate;

applying the coating material to the component; and curing the coated component to a temperature of from about 800 to about 850° F. for a duration of from about 45 to about 75 minutes;

wherein the coating material is dissolved in a solvent selected from the group consisting of ethanol, toluene, methyl ethyl ketone and mixtures thereof.

3. A ferrous-alloy aircraft structural component comprising:

a ferrous-alloy precursor having a predetermined heat-treatment temperature; and a curable, organic coating made from a material having a non-volatile portion that is curable at about the predetermined ferrous-alloy heat-treatment temperature, wherein the precursor and the coating are simultaneously heat-treated to a temperature of from about 800 to about 850° F. for a duration of from about 45 to about 75 minutes.

4. The component of claim 3, wherein the ferrous-alloy precursor is selected from the group consisting of Aermet 100, 300M, H-11, HP9-4-30, 52100, 1095, 4130, 4135, 4140, 4330V, 4340, 6150, and 8740.

5. The component of claim 3, wherein the ferrous-alloy precursor is 8740 alloy.

6. The component of claim 3, wherein the aircraft structural component is selected from the group consisting of fasteners, fittings, hinges, bearings, gears, and struts.

7. The component of claim 3, wherein the organic coating comprises a phenolic resin mixed with at least one plasticizer, and an inorganic additive selected from the group consisting of aluminum powder and strontium chromate.

8. The component of claim 7, wherein the coating comprises polytetrafluoroethylene.

9. The component of claim 3, wherein the coating is dissolved in a solvent selected from the group consisting of ethanol, toluene, methyl ethyl ketone and mixtures thereof.

10. The component of claim 9, wherein the coated component is exposed to a temperature of from about 180 to about 220 degrees F for about two minutes to liberate the solvent from the coating.

11. The component of claim 3, wherein the coating comprises a sprayable solution having about 30 weight percent ethanol, about 7 weight percent toluene, about 45 weight percent methyl ethyl ketone, about 2 weight percent aluminum powder and about 2 weight percent strontium chromate.

12. The component of claim 3, wherein the coating is cured for about 1 hour at a temperature in a range of from about 375 to about 425 degrees F.

13. The component of claim 3, wherein the coated component is heat-treated to a temperature of from about 800 to about 850 degrees F. for a duration of from about 45 minutes to about 75 minutes.

14. The component of claim 3, wherein the coating is applied to the component to a thickness of from about 0.0003 to about 0.0005 inch.

15. An aircraft comprising a ferrous-alloy aircraft structural component comprising:
a ferrous-alloy precursor having a predetermined heat-treatment temperature;
a curable, organic coating made from a material having a non-volatile portion that is curable at about the predetermined ferrous-alloy heat-treatment temperature, wherein the precursor and the coating are simultaneously heat-treated to a temperature of from about 800 to about 850° F. for a duration of from about 45 to about 75 minutes.

16. The aircraft of claim 15, wherein the ferrous-alloy precursor is selected from the group consisting of Aermet 100, 300M, H-11, HP9-4-30, 52100, 1095, 4130, 4135, 4140, 4330V, 4340, 6150, and 8740.

17. The aircraft of claim 15, wherein the ferrous-alloy precursor is 8740 alloy.

18. The aircraft of claim 15, wherein the aircraft structural component is selected from the group consisting of fasteners, fittings, hinges, bearings, gears, and struts.

19. The aircraft of claim 18, wherein the aircraft structural component is selected from the group consisting of fasteners, washers, springs, screws, bolts, nuts and rivets.

20. The aircraft of claim 15, wherein the organic coating comprises a phenolic resin mixed with at least one plasticizer, polytetrafluoroethylene and an inorganic additive selected from the group consisting of aluminum powder and strontium chromate.

21. The aircraft of claim 15, wherein the coated component is exposed to a temperature of from about 180 to about 220 degrees F. for about two minutes to liberate a solvent from the coating.

22. The aircraft of claim 15, wherein the coating is cured for about 1 hour at a temperature in a range of from about 375 to about 425 degrees F.

23. The aircraft of claim 15, wherein the coated component is heat-treated to a temperature of from about 800 to about 850 degrees F for a duration of from about 45 minutes to about 75 minutes.

24. The aircraft of claim 23, wherein the coating is applied to the component to a thickness of from about 0.0003 to about 0.0005 inch.

* * * * *